United States Patent [19]

Goldmann et al.

[11] 4,035,139

[45] July 12, 1977

[54] METHOD OF HEAT TREATING FINE GRANULAR MATERIAL

[75] Inventors: Wolf Goldmann; Georg Schepers, both of Ennigerloh; Horst Ritzmann, Enniger; Heinz-Werner Thiemeyer, Neubeckum, all of Germany

[73] Assignee: Polysius AG, Neubeckum, Germany

[21] Appl. No.: 667,884

[22] Filed: Mar. 18, 1976

[30] Foreign Application Priority Data

May 22, 1975  Germany .......................... 2522598

[51] Int. Cl.² ...................... F27B 15/00; F27B 7/02
[52] U.S. Cl. .................................. 432/14; 432/58; 432/106
[58] Field of Search .................. 432/14, 15, 58, 106

[56] References Cited

U.S. PATENT DOCUMENTS

| 3,881,861 | 5/1975 | Ritzmann | 432/14 |
| 3,904,353 | 9/1975 | Bosshard et al. | 432/14 |
| 3,910,754 | 10/1975 | Weber et al. | 432/14 |
| 3,932,116 | 1/1976 | Hansen | 432/14 |
| 3,932,117 | 1/1976 | Ritzmann | 432/14 |

*Primary Examiner*—John J. Camby
*Attorney, Agent, or Firm*—Marshall & Yeasting

[57] ABSTRACT

A chamber which forms a material inlet and an exhaust gas outlet at one end of a rotary kiln has an inclined bottom arranged to cause preheated fine material deposited thereon to slide by gravity into the end of the rotary kiln. A dense stream of fine granular material is deposited on such inclined surface, and fuel in finely divided form is introduced into the dense stream of material flowing down the inclined surface to cause the fuel to become intimately mixed with the material. Gas is discharged from the kiln in contact with the stream of material as such a velocity as to entrain a substantial proportion of such stream, the temperature and composition of the gas being such as to cause combustion of the fuel mixed with the entrained material.

4 Claims, 2 Drawing Figures

METHOD OF HEAT TREATING FINE GRANULAR MATERIAL

BACKGROUND OF THE INVENTION

This invention relates to a method for the heat-treatment of fine granular material such as ground raw cement which is pre-warmed and heated in a pre-heater by the hot exhaust gases from a rotary kiln, and is then finally fired in the rotary kiln, wherein the material is repeatedly separated from the gas stream in the pre-heater and under the force of its own weight reaches a lower zone of the pre-heater in the form of a dense stream of material and in such lower zone at least part of the stream of material is again broken down in an oppositely directed gas stream, and wherein fuel in finely divided form is added to the stream of material before its breaking down in the gas stream.

In the manufacture of cement, alumina, lime, magnesite, dolomite and the like the heat treatment of the fine granular material is frequently effected by first heating the material in a pre-heater by the hot exhaust gases from a rotary kiln before it is finally fired or sintered in that kiln. In such case the greater part of the heating operation is provided in the rotary kiln, while only a lesser part of the total heat energy is applied to the material while in the pre-heater. In view of the higher specific capital costs of the rotary kiln this division of the heating operation between rotary kiln and pre-heater is not optimal.

To enable the rotary kiln to be smaller in cross-section and/or length, there has previously been disposed between the pre-heater and the kiln a pre-firing zone wherein the pre-warmed material is heated as intensely as possible. The particular problem in designing such a pre-firing zone is that extremely uniform supply of fuel to the material is necessary to avoid any overfiring of individual particles of material (with all the associated evils such as caking agglomerating, etc.).

In one known method this pre-firing zone comprises a fluidised layer directly heated by burners, from which the material passes into the kiln. Another known method utilises a firing chamber with the material and fuel fed tangentially in and out. The disadvantage of these solutions lies in the considerable capital costs of the pre-firing zone, which lose an appreciable part of the savings made possible by reducing the size of the rotary kiln.

In another known method the pre-firing zone comprises a cyclone firing chamber to which a separate gas-stream is delivered by a blower; the gases leaving this cyclone firing chamber combine with the exhaust gases from the rotary kiln in a conduit leading from the kiln to the lowermost cyclone in the pre-heater. The material withdrawn from the penultimate cyclone in the pre-heater and the fuel are supplied separately to this cyclone firing chamber. In this firing chamber there is consequently formed a flame whose heat must be transferred to the individual solid particles, partly by radiation and partly by contact.

A particular disadvantage of this known method, apart from the expenditure on plant caused by the additional use of a cyclone firing chamber with its associated equipment, is the inefficient heat transfer from the flame produced in the cyclone firing chamber to the individual particles of material, especially since only a very brief period is available therefore, and a considerable proportion of the material fed into the cyclone firing chamber is immediately removed again from that chamber by the gas stream.

Finally a method is described in U.S. Pat. No. 3,904,353 wherein additional fuel and waste gas from a cooler are fed into the gas conduit which leads from the rotary kiln to the cyclone pre-heater and wherein the material outlet conduit from the penultimate cyclone stage terminates. Since this fuel encounters combustion conditions immediately on entering the gas conduit, the fuel is largely burned before it comes into contact with the solid material. In order to achieve adequate heat transfer from the combustion gases to the material, the gas conduit leading to the cyclone pre-heater must be made relatively long, which involves considerable extra expense on plant. Nevertheless this method cannot prevent a considerable part of the heat energy contained in the extra fuel from leaving the pre-heater with the exhaust gases, which worsens the thermal balance.

In accordance with U.S. Pat. No. 3,910,754 the above described defects of known methods are avoided by feeding the fuel to the stream of material in the pre-heater at a position whereat this material re-enters the gas stream flowing through the pre-heater; the fuel is thus fed in finely divided form into the stream of material before this stream has completely broken down in the gas stream.

It has in fact been found that substantially uniform mixing of the pre-heated material with the finely divided fuel is the main pre-requisite for high heat transfer to the material during the subsequent firing process without overheating of individual particles. If the fuel is now added to the stream of material while not yet fully diffused into the gas stream, this ensures that combustion conditions are not yet present, at least immediately on feeding in the fuel. Only when the stream of solid material mixed with fuel is entrained in the gas stream do the consequent drop in the concentration of solids and the increased access of oxygen to the fuel then produce combustion conditions. Since the fuel is added to the stream of material while this is not yet diffused into the gas stream, the individual fuel particles adhere directly to the particles of solid material, and in this manner are distributed over the entire cross-section of the gas conduit when the stream of material is entrained. If for example oil is added as the fuel, the individual solid particles are coated with an oil film before they and the fuel reach the gas stream wherein combustion conditions prevail. In this manner heat is thus produced directly at the heat consumer, so that optimum transfer of heat from fuel to solid material is achieved in very brief time and over a very small distance.

In a further development of the method of the latter patent, this invention is directed to the problem of determining the position in the pre-heater at which the addition of fuel is most effective.

According to the invention, this problem is solved in that the fuel is added to the stream of material present in the lowest section of the pre-heater.

The maximum concentration of fine-grained material is in fact present in this region. Hence in this region there is the best assurance that the fuel and solid material will first be intimately mixed before combustion conditions are produced by the access of combustion air.

The supply of fuel to the lowest section of the pre-heater has the further advantage that the hot gases formed during combustion must pass through the entire pre-heater and will therefore have maximum opportunity to transfer their heat energy to the material being pre-heated.

The method in accordance with the invention is marked by a high specific efficiency (in relation to the plant dimensions) and very favourable heat consumption.

The method can with advantage be applied in floatation gas pre-heaters of various constructions. It can be applied particularly with a counter-flow shaft pre-heater having a number of cross-sectional restrictions, or when using a pre-heater consisting of several cyclones and centrifugal chambers disposed one above the other.

The pre-heater has in its lower part a chute-like inclined surface along which the material is fed to the rotary kiln, and the addition of the fuel to the stream of solid material takes place in the vicinity of this chute-like surface. Thus for example liquid fuel can be sprayed on to the stream of material moving downwards along the chute-like inclined surface.

A considerable proportion of the stream of material present in the lowest part of the pre-heater and moving along the said chute-like surface, is entrained in the zone of transition to the rotary kiln by the exhaust gases from that kiln, whirled up and carried back into the lower part of the pre-heater. Since the fuel added to the solid material is burned here, ie to a great extent in the lowest part of the pre-heater, optimum heat transfer to the solid material and considerable heating of the material before it enters the rotary kiln are achieved.

DESCRIPTION OF THE PREFERRED EMBODIMENTS

Figure 1:
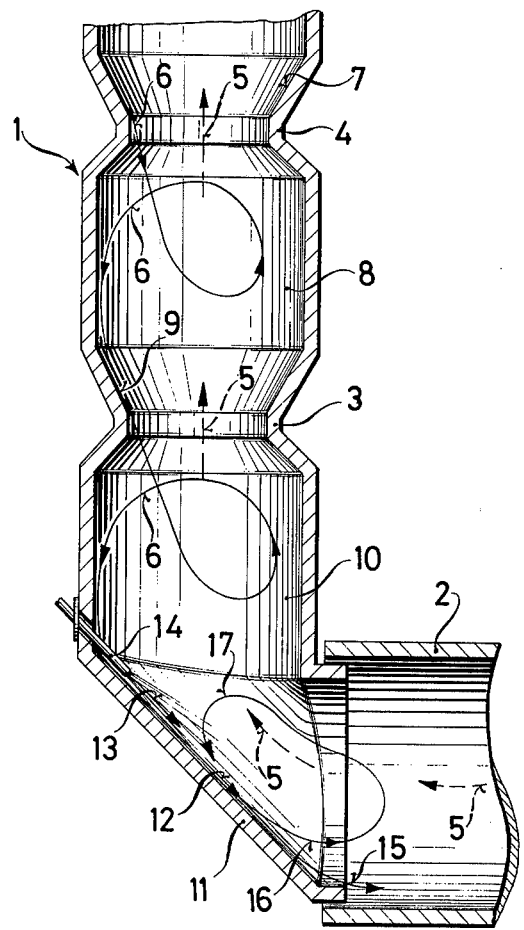
FIG. 1 is a fragmentary vertical section showing the invention applied to a shaft preheater.

The plant shown in FIG. 1 for the heat-treatment of fine granular material comprises a counter-flow shaft pre-heater 1 (shown in part only) and a rotary kiln 2 (also with only its inlet head area shown). The counter-flow shaft pre-heater 1 is provided with cross-sectional constrictions (e.g. 3, 4) superimposed at intervals and is traversed from the bottom upwards by exhaust gases (arrow 5) from the rotary kiln 2.

The fine grained material moves generally downwards in the shaft pre-heater 1, following a path which is indicated very schematically by the arrows 6. If for example the stream of material passes along the funnel portion 7 located above the cross-sectional constriction 4 into the next chamber 8 below in the shaft pre-heater, the stream of material is again broken up in the oppositely flowing gas stream (arrow 5), is in part taken a further distance upwards again, and is then again deposited on the pre-heater wall. The material then passes along the funnel portion 9 located above the next cross-sectional constriction 3 into the lowest pre-heater chamber 10, where the described sequence is repeated.

The stream of material (arrow 12) deposited in the chamber 10 is then fed into the rotary kiln 2 along a chute-like inclined surface 11 forming the lower closure of the counter-flow shaft pre-heater 1.

In accordance with the invention fuel (arrow 13) is supplied in finely divided form to the stream of material (arrow 12) in the area of this chute-like inclined surface 11; this can be effected for instance by spraying liquid fuel through one or more lances 14.

A certain proportion (arrow 15) of the stream of solid material (arrow 12) immediately enters the rotary kiln 2. A greater proportion (arrow 16) of the stream (arrow 12) is however entrained in the zone of transition to the kiln 2 by the exhaust gases (arrow 5) from the kiln, and is taken back to the lowest chamber 10 of the shaft pre-heater (arrow 17).

In the area of the chute-like inclined surface 11 the added fuel (arrow 13) is mixed with the stream of solid material present there in relatively high concentration. However combustion of this fuel primarily only occurs when the solid material is again scattered in the gas stream.

Figure 2:
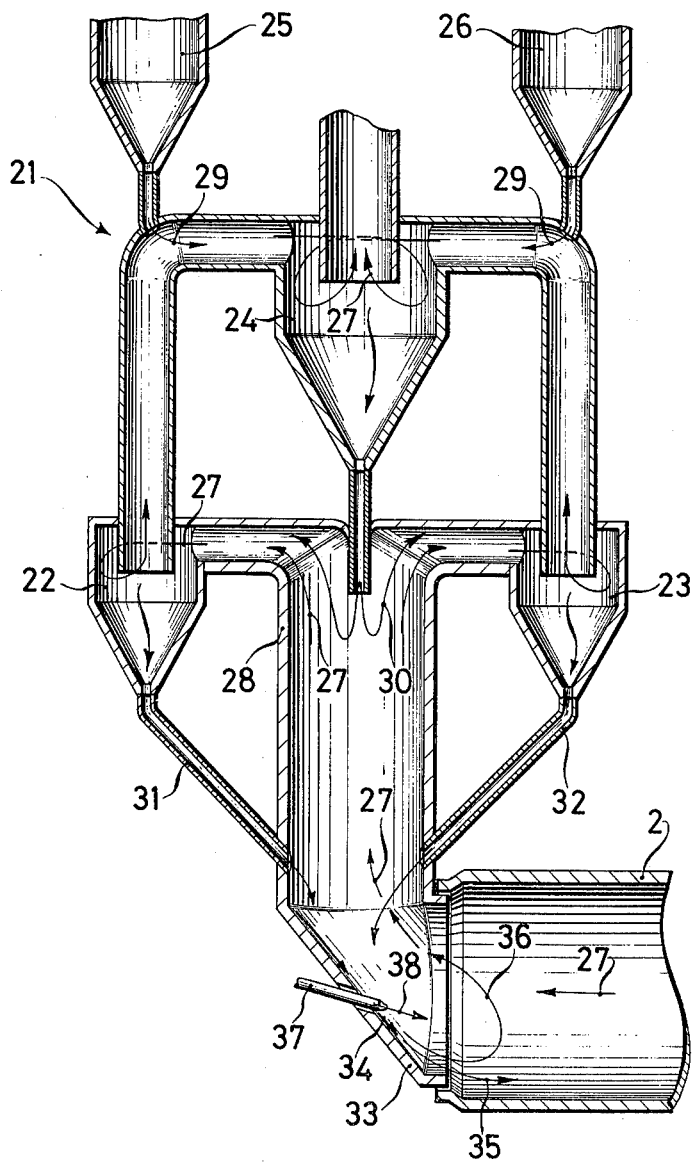
FIG. 2 is a fragmentary vertical section showing the invention applied to a cyclone preheater.

With the plant shown in FIG. 2, the pre-heater 21 preceding the rotary kiln 9, and again with only its lower part shown, comprises a number of superimposed cyclones and centrifugal chambers. The lowest stage of the pre-heater comprises two cyclones 22, 23 operating in parallel; the next upwards stage of pre-heater 21 has a central cyclone 24; the next upwards stage has again two cyclones 25, 26 in parallel, and so on.

The exhaust gases from the rotary kiln 2 (arrows 27) first pass through a conduit 28 leading to the cyclones 22, 23. The two divided gas streams which pass through the cyclones 22 and 23 unite in the central cyclone 24, and so on.

The solid material (arrows 29) deposited from the cyclones 25, 26 enters the cyclone 24, is again deposited, then passes (arrows 30) into the conduit 28, is reversed by the rising gases and taken thereby into cyclones 22, 23. After deposition in these cyclones 22, 23 the pre-heated solid material then travels via the outlet pipes 31, 32 on to the chute-like inclined surface 33 forming the lower closure of the conduit 28. This stream of material (arrow 34) divides again, in the manner already explained with reference to FIG. 1, into two sections: one part of the stream (arrow 35) passes immediately into the rotary kiln 2, while the other part (arrow 36) is again entrained by the kiln exhaust gases and is fed once more into the conduit 28 (or even back into the cyclones 22, 23).

Fuel (arrow 38) is sprayed through lances 37 on to the stream of material moving downwards along the chute-like inclined surface 33 in the lowest part of the pre-heater, or is introduced by other methods into said stream. In this embodiment again the fuel and solid material thus mix together very intimately before the solid material flow is again broken down in the gas stream, and the fuel burns on the individual particles of material or in the immediate vicinity of such particles.

What we claim is:

1. A method of heat-treating fine granular material entering a rotary kiln, in a chamber which forms a material inlet and an exhaust gas outlet at one end of a rotary kiln, and which has an inclined bottom surface arranged to cause preheated fine material deposited thereon to slide by gravity into the end of the rotary kiln, wherein the improvement comprises the steps of depositing a dense stream of fine granular material on such inclined surface, introducing unburned fuel in finely divided form into the upper portion of the dense stream of material flowing down the inclined surface to cause the fuel to become intimately mixed with the material, and causing hot gas to be discharged from the kiln in contact with the mixed stream of material and fuel at such a velocity as to entrain a substantial proportion of such stream, to cause combustion of the fuel in the entrained material.

2. A method according to claim 1 wherein the chamber having an inclined bottom surface is at the lower end of a counter-flow shaft preheater having a plurality of cross-sectional constrictions, comprising the step of causing fine granular material to flow down the shaft preheater onto said inclined bottom surface, in contact with gas from the rotary kiln.

3. A method according to claim 1 wherein the chamber having an inclined bottom surface is arranged to receive material from a preheater having a plurality of centrifugal chambers disposed one above the other, comprising the step of causing fine granular material to pass through the centrifugal chambers in series, in counter-flow contact with gas from the rotary kiln.

4. A method according to claim 1 wherein the fuel is introduced by spraying liquid fuel into the dense stream of material flowing down the inclined bottom surface.

* * * * *